May 19, 1970     K. M. MURGAS ET AL     3,512,884

ORIGINAL DOCUMENT TRANSPORT SYSTEM FOR A PHOTOCOPY MACHINE

Filed Sept. 18, 1967     3 Sheets-Sheet 1

INVENTORS
KARL M. MURGAS
BURTON GREENBERG
OTTO A. CLARK

BY Robert L. Slater Jr.
ATTORNEY

INVENTORS
KARL M. MURGAS
BURTON GREENBERG
BY OTTO A. CLARK

Robert L. Slater Jr.
ATTORNEY

United States Patent Office 3,512,884
Patented May 19, 1970

3,512,884
ORIGINAL DOCUMENT TRANSPORT SYSTEM
FOR A PHOTOCOPY MACHINE
Karl M. Murgas, 7357 N. Keeler, Lincolnwood, Ill. 60645; Burton Greenberg, 6308 N. Drake, Chicago, Ill. 60645; and Otto A. Clark, 6824 N. Mendota, Chicago, Ill. 60646
Continuation-in-part of application Ser. No. 668,543, Sept. 18, 1967. This application Sept. 18, 1967, Ser. No. 668,339
Int. Cl. G03b 27/48, 27/70, 27/10
U.S. Cl. 355—51                           12 Claims

ABSTRACT OF THE DISCLOSURE

An original document transport system for a photocopy machine having a hinged guide means. The guide means is rotatable from its normal or operative position to an open position to provide access to said original document system for maintenance and retrieval of jammed documents.

BACKGROUND OF INVENTION

This application is a continuation-in-part application of our copending application Ser. No. 668,543, filed Sept. 18, 1967, entitled "A Photocopy Reproduction System."

The present invention relates to photocopy reproduction apparatus such as commonly used in offices, and more particularly relates to an original document transport system adaptable for use in a variety of photocopy machines including electrostatic photocopy machines.

Electrostatic photocopy devices are commonly constructed to pass a specially coated and electrostatically charged sheet of copy paper through the focal plane of an optical camera system. The original document which is to be copied is positioned before the camera objective lens. The image of the document is transferred through the optical camera system and onto the sensitized surface of the copy paper; the exposed or imprinted sensitive surface of the copy paper is then passed through a fluid suspension of ink particles suitably charged to react irreversibly with the electrostatically charged image borne upon the copy paper surface. This process has been fully explained in earlier patent literature and elsewhere under the subject matter of electric photography, electrostatic photography and xerography.

It is both technically inconvenient and costly to view at one instant an entire original document page through an objective lens in a copy machine camera system in order to transfer at one instant the image of the entire document sheet to the sensitized copy paper. To view at one instant an entire sheet of an original document requires an exceptionally wide angle lens and large optical elements having inconveniently long focal lengths. This arrangement is further undesirable by its risk of loss of resolution and possible edge distortion of the image transferred to the copy paper. The cost of the optical components required for viewing a large area instantaneously are appreciably greater than the cost of optical components designed for viewing a relatively smaller area. The less expensive and smaller optical system can be utilized to advantage in a photocopy machine where means are provided for viewing small areas of the original document during successive short intervals of time and means are also provided for moving the sensitized surface of the copy paper in a coordinated manner in the camera focal plane.

Earlier photocopy machine inventors have, for instance, avoided designs that require wide angle optical components by passing the original document borne on a moving carriage before the objective lens of a moving camera system. The movement of the carriage can be coordinated with movement of the camera system as a whole while the sensitized copy paper is held fixed in the camera focal plane and the image is projected onto it in successive increments as the carriage moves past. Alternately, the original document may be fixedly placed face down on a transparent glass plate while the camera system and a sheet of sensitized copy paper held in the focal plane of the camera is moved beneath the original document and the image thereon is transferred by successive small increments onto the sensitized copy paper. The moving carriage requires a substantial space and mechanical complexity, and therefore photocopy machines so equipped are likely to be bulky in size, heavy and inherently slow. The moving carriage can not be rapidly accelerated and must be returned after each cycle to a starting position before the next print cycle can be initiated.

A lighter, smaller and more rapid print cycle photocopy machine may be constructed if the original document is transported by means of a set of rollers before the objective lens of the copy machine camera, and simultaneously sensitized copy paper is moved in the camera focal plane at a direction and speed coordinated with the changing image transferred through the camera optical system. Such apparatus has been constructed but has been subject to stringent limitations during operation to avoid malfunction of the original document transport system and resultant loss or damage to the original document.

The earlier photocopy machines in which an original document is moved before the photocopy camera objective lens through a set of rollers mounted in a fixed frame provided a considerable advantage in speed, weight and size over the prior photocopy machine designs. Unfortunately, the original documents fed into these fixed roller transport machines were frequently subject to malfunction. The document, if printed on light weight tissue paper, would catch on a roller and either tear or be wound around a roller and fail to be returned to the machine operator.

Previously to the invention herein, it was extremely difficult to adjust the rollers used to move the original document, whether printed on tissue paper or heavy stiff parchment, at an even rate before the objective lens, to avoid blurred or distorted copies. Consequently this required frequent expensive service and maintenance. Moreover, the original documents not infrequently would catch on the rollers and in the interstices between the guide surface and rollers and would require an experienced serviceman to free the document. Not only was this expensive but resulted in substantial periods during which the photocopy machine was inoperative.

SUMMARY OF THE INVENTION

A need therefore exists for a light weight, compact and rapid cycle photocopy machine which utilizes only less expensive small optical components, is relatively free of maintenance requirements, and is substantially jam free in normal operation. Therefore, the invention herein provides guide means for an original document transport system which is movable from its closed or operative position to an open position to afford convenient access into the pathway of the original document, for removal of a jammed document or for maintenance and adjustment of the rollers.

A primary object of our invention, accordingly, is to provide an improved highly reliable rapid cycling original document transport system for photocopy machines.

Another object of our invention is to provide an inexpensive simply designed original document transport system for passing a document to be copied with precise positioning and at a constant speed, before an object lens of a photocopy camera system.

Another object of our invention is to provide a rapid cycle, original document transport system which an untained machine operator can readily clear in the event of any malfunction.

Another object is to provide convenient access to the pathway of the original document for the removal of a jammed document and for maintenance or adjustment of the spacing between cooperating rollers which move the document.

These and other objects and advantages of the invention will become apparent from the illustrations in the accompanying drawings and the following specification and claims.

BRIEF DESCRIPTION OF THE DRAWINGS

Referring to the drawings in which the same characters of reference are employed to indicate corresponding or similar parts throughout the several figures of the drawings.

DESCRIPTION OF PREFERRED EMBODIMENT

Figure 1:
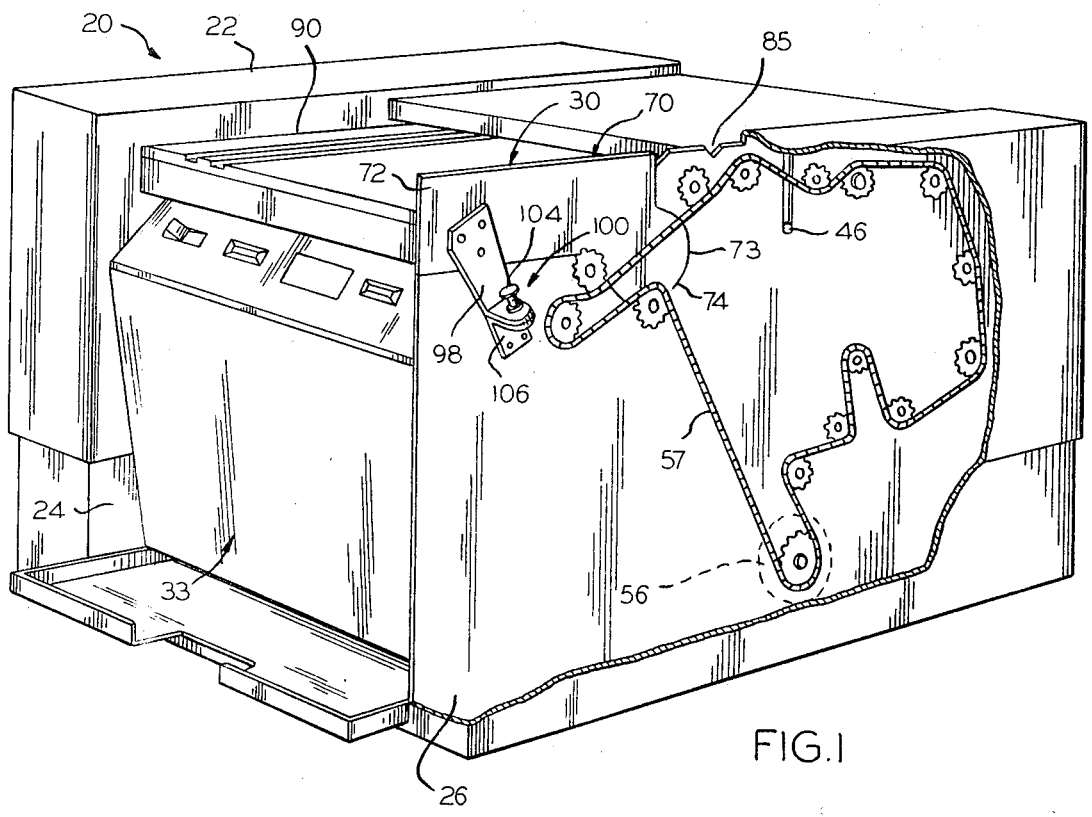
FIG. 1 is a perspective view of the photocopy machine embodying the principles of the invention, with portions cut away to show the drive means for rotating the cooperating pairs of rollers of the original document and copy paper transport systems.

Referring now to the several figures of the drawings, the reference numeral 20 indicates generally a photocopy reproduction machine embodying the principles of the invention. The photocopy machine 20 comprises a substantially rectangular shaped frame 22 having a pair of parallel spaced apart sidewalls 24, 26. As may be seen from FIG. 3, the photocopy machine 20 comprises an original document transport system indicated generally by the reference numeral 28, a copy paper transport system indicated generally by the reference numeral 30 and a stationary camera system indicated generally by the reference numeral 32.

System operation

Figure 2:
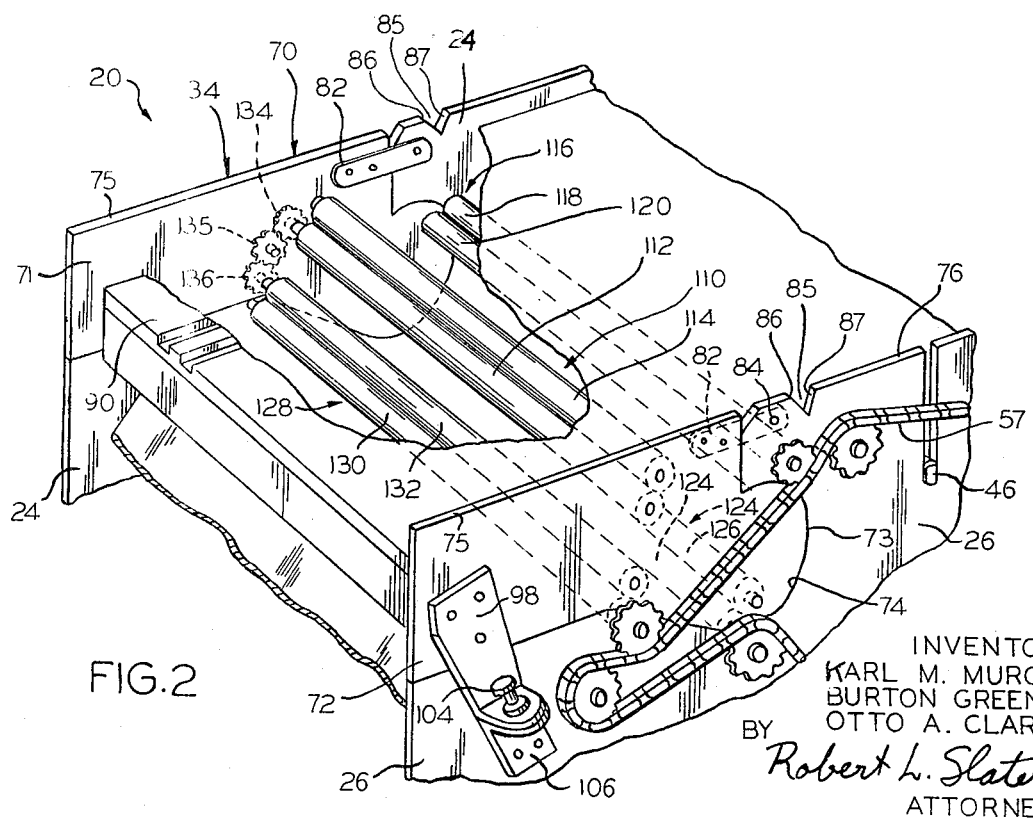
FIG. 2 is an enlarged fragmentary perspective view with portions cut away to show the position of the cooperating pairs of rollers in the original document transport system.
Figure 3:
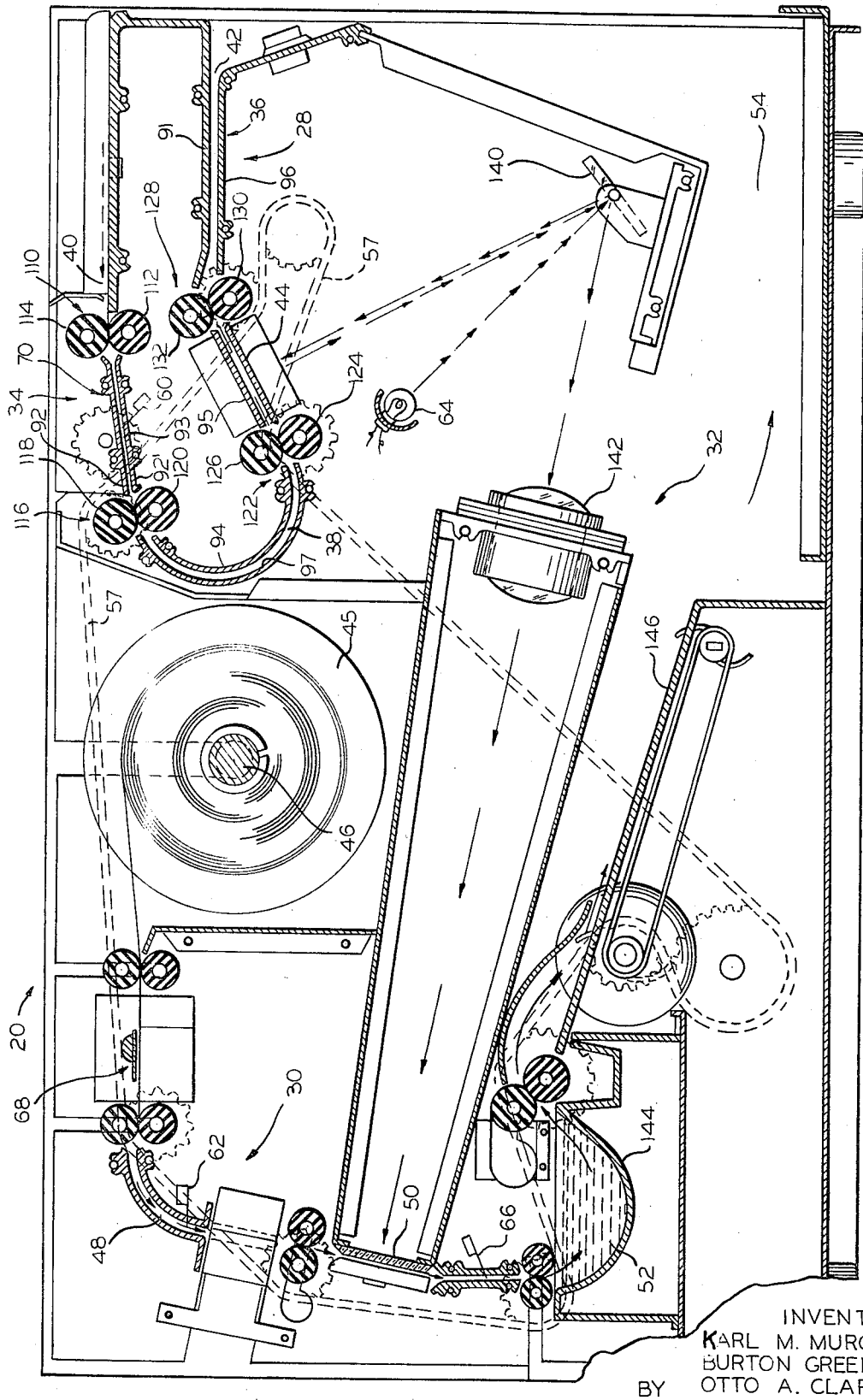
FIG. 3 is an enlarged sectional schematic view of the photocopy machine of FIG. 1.
Figure 4:
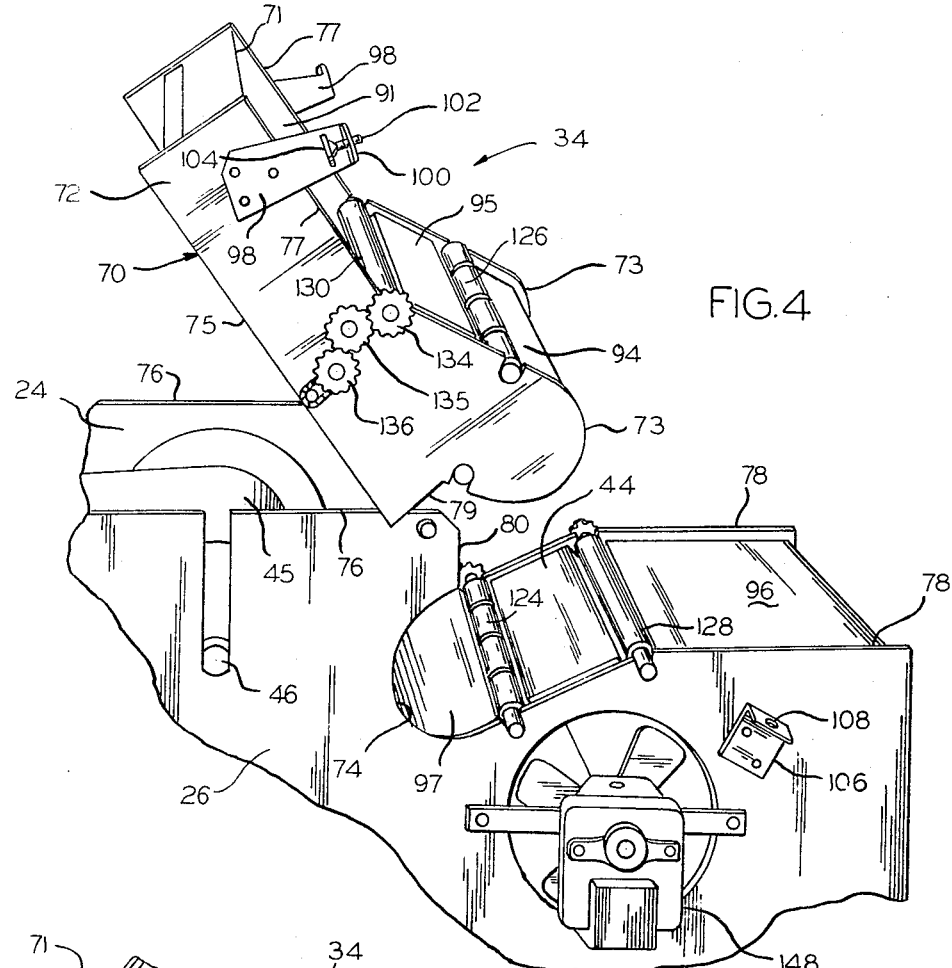
FIG. 4 is a fragmentary perspective view showing the hinged guide means in its open position.

The original document transport system 28 includes a hinged guide means 34 rotatably attached to the opposed sidewalls 24, 26 of the frame 22. A cooperating fixed guide means 36 is mounted to the sidewalls 24, 26. The hinged guide means 34 has a closed position, as shown in FIGS. 2 and 3, spaced from the fixed guide means 36 to define a pathway 38 for the passage of an original document inserted into the photocopy machine. The hinged guide means 34 is rotatable from the closed position to an open position as shown in FIG. 4. The rotatable capability of the hinged guide means 34 provides convenient access to the pathway 38 for purposes of maintenance and for removal of the original document in the event of a malfunction. Therefore, safe recovery of any document or paper inserted into the machine is assured.

The original document is inserted at an input 40 on the front side 33 of the photocopy machine (FIGS. 1, 2 and 3) and moved through the pathway 38 to an output 42 located below the input 40. A section of transparent glass 44 is positioned in the pathway 38 (FIGS. 3 and 4) to enable increments or portions of the image of the moving document to be conveyed to the camera system 32.

The copy paper is dispensed from a roll 45 supported on a spindle 46 and advanced through a pathway 48 disposed at the rear of the photocopy machine (FIG. 3). A section of transparent glass 50 is positioned in the pathway 48. When the original document passes over the glass section 44, it is reproduced by the camera means 32 onto the copy paper moving across the glass section 50.

The pathway 48 leads into a toner solution 52 which develops the copy paper. From the toner solution 52, the copy paper is transported to an output 54 which is at the bottom of the front side 33 of the photocopy machine.

The original document transport system 28 and the copy paper transport means 30 comprise a plurality of sets or pairs of cooperating rollers which transport the original document and the copy paper simultaneously and at substantially the same rate of speed through the machine. The rollers will be more fully referred to later in the description. A motor 56 (FIG. 1) drives a continuous drive chain 57 (FIGS. 1 and 3), which in turn drives the rollers of the original document and copy paper transport systems 28, 30.

A control switch 60 is switched "on" by the leading edge of the original document (FIG. 2) after the original has been inserted into the photocopy machine. The control switch 60 activates the means for pulling the copy paper from the roll 45 and into the copy paper pathway 48.

An exposure switch 62 is switched "on" by the leading edge of the copy paper before the copy paper reaches the glass section 50, causing the lighting of a high intensity lamp 64 (FIG. 3). When the lamp 64 is "on" the camera means 32 reproduces the moving original passing across glass 44 onto the moving copy paper passing across glass 50. A light-hold switch 66 is turned "on" by the leading edge of the copy paper after the leading edge has passed over the glass section 50.

As the trailing edge of the original paper moves past the control switch 60, the control switch 60 automatically returns to its off-position which causes the activation of a knife means indicated generally by the reference numeral 68 (FIG. 3). The knife means 68 severs a length of the copy paper from the roll 45, substantially equivalent to the length of the original.

Switch 62 automatically returns to its off-position after the trailing edge of the copy paper has passed the switch 62. The lamp 64 remains "on" by the light-hold switch 66. After the image is reproduced on the copy paper and the trailing edge of said length of copy paper has passed the glass section 50, switch 66 automatically returns to its off-position and causes lamp 64 to turn-off. The copy then passes through the toner solution 52 and finally deposited at output 54.

Original paper transport system

Figure 5:
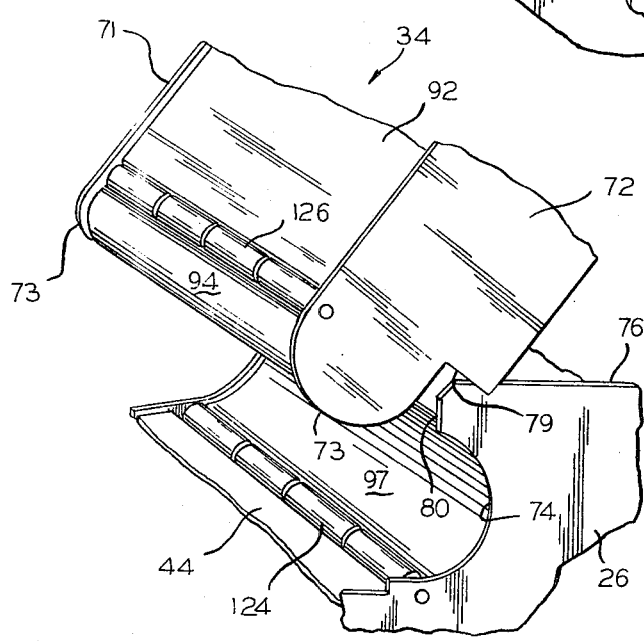
FIG. 5 is a fragmentary enlarged perspective view showing the complementary concave and convex surfaces of the original document transport system.

The original paper transport system 28 includes the hinged guide means 34 cooperating with the fixed guide means 36. The hinged guide means 34 has a closed or operative position (FIGS. 1 to 3) and an open position (FIGS. 4 and 5).

The guide means 34 comprises a module 70 having a pair of spaced apart and opposed side frame members 71, 72. In the closed position for the hinged means 34, as shown in FIGS. 1 and 2, the side frame members 71, 72 are in substantial alignment with the sidewalls 24, 26. As shown, convex inner edges 73 of the side members 71, 72 position in cut-outs 74 formed in the sidewalls 24, 26 of the frame 22. The upper longitudinal edges 75 of the module 70 are in substantial alignment with the upper longitudinal edges 76 of the sidewalls 24, 26. The lower longitudinal edges 77 of the module side members 71, 72 position above the downwardly recessed outer edges 78 of sidewalls 24, 26. The inner vertical edges 79 of the module side members 71, 72 disposed above convex edges 73 are opposed to the inner vertical edges 80 of the sidewalls 24, 26.

A bar member 82 is rigidly attached at one end to the inside surface 83 of the sidewall members 71, 72 (FIG. 2). At the opposite end, the bar member 82 is hingedly attached to a pin 84 which is fastened to each sidewall 24, 26 and extends inward from the corresponding inside surface thereof.

A substantially V-shaped notch 85 is cutout downwardly from the upper longitudinal edges 76 of the sidewalls 24, 26. The V-notch 85 is defined by an outer edge 86 substantially perpendicular to an inner edge 87.

The inner edge 87 of the V-notch 85 provides a stable resting support for the module 70 when it is pivoted to an open position as shown in FIGS. 4 and 5. In the open position, the longitudinal edges 75 of the module 70 abut the inner edges 87 of the V-cutouts 85, and the vertical edges 79 of the module 70 are positioned above the outer edges 86 of the V-cutouts 85 at substantially the same angle of incline.

The module 70 further comprises an original document feed tray 90 (FIG. 1) mounted between the side frame members 71, 72 and spaced inward from the upper longitudinal edges 65 thereof. The original document is initially properly positioned on the feed tray 90 before being inserted into the machine. Spaced below in an opposed relationship to the feed tray 90, is a bottom wall 91 (FIG. 3).

A pair of parallel spaced apart wall sections 92, 92' defining a pathway 93 (FIG. 3) inclines downward from the feed tray 90 toward an arcuate wall having a convex outer surface 94 (FIGS. 3, 4 and 5). The original document passes from on the feed tray 90 into the pathway 93.

An inclined wall 95 extends upward from the convex surface 94 toward the bottom wall 91 (FIGS. 3 and 4). The feed tray 90, the inclined walls 92, 92', the convex surface 94, the inclined wall 95 and bottom wall 91 extend across the lateral length between the module side frame members 71, 72.

The fixed guide means 36 comprises a horizontal surface 96 (FIG. 4) and a concave surface 97 (FIGS. 3, 4 and 5) substantially complementary with the convex surface 94 of the module. Disposed between the concave surface 97 and the horizontal surface 96 is the glass section 44. When the hinged guide means is in the closed or operative position (FIG. 3), the concave surface 97, the glass section 44 and the horizontal surface 96 of the stationary guide means 36 are spaced respectively from the convex surface 94, the inclined wall 95 and the bottom wall 91 of the module 90 and define the pathway 38 for the original document. The complete pathway for the original document between input 40 and output 42 comprises the pathway 38 and the spacing or pathway 93 between the inclined walls 92, 92' of the module 70 (FIG. 3).

A pair of right angled upper brackets 98 are rigidly attached to the side members 71, 72 of the module 70. A press-fitting locking means indicated generally by the reference numeral 100 is associated with each bracket 98. The locking means 100 comprises an expandable sleeve 102 (FIG. 4) which receives a movable peg 104. When the outer end of the peg 104 is pressed into the sleeve 102, the sleeve 102 expands outwardly.

A pair of right angled lower brackets 106 are rigidly attached to the sidewalls 24, 26 of the frame 22. An aperture 108 (FIG. 4) is formed in each lower bracket 106. When the hinged guide means is in the closed position, the sleeve 102 positions into the aperture 108. By pressing the peg 104 into the sleeve, the sleeve 102 expands outwardly into a tight-fitting relationship with the defining edge of the aperture 108 and thereby releasably locks the hinged guide means 34 in its closed and operative position (FIGS. 1, 2 and 3).

The original document is transported through the pathways 38, 93 from the input 40 to the output 42 by a plurality of sets of cooperating rollers. A pair of input feed rollers 110 initially grip the original document atfer it has been properly positioned on the input feed tray 90 and manually moved forward into the photocopy machine. The input feed rollers 110 comprise a drive roller 112 gear linked to the drive chain 57 and an idler roller 114. The feed rollers 110 extend laterally within the module and are journalled to the side frame members 71, 72 between the feed tray 90 and the inclined wall sections 92, 92'. The gear linking of the drive roller 112 with the chain 57 is referred to in more detail below.

A second pair of rollers 116 comprising a drive roller 118 and an idler roller 120 move the original into the space of the pathway 38 defined between the concave surface 97 and the convex surface 94. The drive roller 118 is rotatably attached to the sidewalls 24, 26 of the frame 22 and gear linked with the drive chain 57. The idler roller 120 is journalled to the side frame members 71, 72. The second pair of rollers 116 is positioned between the inclined walls 92, 92' and the concave and convex surfaces 94, 97.

A third pair of rollers 122 comprising a drive roller 124 and idler roller 126 move the original out from the arcuate space between the convex and concave surfaces 94, 97 to across the glass section 44 and into the grip of the fourth pair of rollers 128. The drive roller 124 is journalled to the sidewalls 24, 26 of the frame 22 between the concave surface 97 and the glass section 44 and gear linked with the chain 57. The idler roller 126 is journalled to the side frame members 71, 72, of the module 70 and positioned between the convex surface 94 and the inclined wall 95.

The output or fourth pair of rollers 128 comprises a drive roller 130 journalled to the sidewalls 24, 26 of the frame 22 positioned between the glass section 44 and the horizontal surface 96 and gear linked with the drive chain 57. The drive roller 130 rotates an idler roller 132 which is journalled to the side frame members 71, 72 of the module 70 between the inclined wall 95 and bottom wall 91. The output roller pair 128 transports the original to the output 42.

Referring now particularly to FIGS. 2 and 4, it is shown that three gears 134, 135 and 136 link the drive roller 112 of the input roller set 110 with the idler roller 132 of the output roller set 128. Therefore, the drive to the drive roller 112 is transmitted via the idler roller 132 by the drive roller 130.

The sets of rollers 110, 116, 122, 128 transport the original document across the glass 44 at substantially the same speed as the copy paper is being transported across the glass 50. When the leading edge of the copy paper turns the switch 62 "on" to energize the lamp 64, the original document is deflected by a mirror 140 into the focal plane of an objective lens 142. The lens 142 beams the image on the sensitive surface of the photosensitive copy paper which is passing over the glass section 50. The photosensitive copy paper is passed through the toner solution 52 contained in a receptacle 144 and slides down an elongated output chute 146 to output 54. A fan 148 (FIG. 4), internally cools the parts of the photocopy machine 20 to insure reliable operation.

If a malfunction occurs in the original document transport system 28 and the document inserted does not return, access inside the system is obtained merely by lifting the peg 104 upward to release the locking means 100 and rotating the module 70 of guide means 34 from the closed to the open position. In the fully open position, the module is supported by the inner edge 87 of the cut-out 85. Now the document may be easily removed. Moreover, when the guide means 34 is in the open position adjustment of the rollers and general maintenance may be performed with substantially less time and effort than was heretofore required with prior document transport systems.

The foregoing specification and description are intended as illustrative of the invention, the scope of which is defined in the following claims.

We claim:

1. In a reproduction apparatus including a pair of sidewalls mounted in spaced relationship, a camera means disposed between the sidewalls, a supply of copy paper, a copy paper transport system for transporting the copy paper past the image focal plane of the camera means, an original document transport system to transport the original document from an input on the front side of the apparatus to an output on the front side of the apparatus for reproduction by the camera means onto the copy paper, the herein improvement being the original document transport system comprising:

a fixed guide means mounted to said sidewalls; and a hinged guide means rotatably mounted to said sidewalls, said hinged guide means having a closed position to cooperate with the fixed guide means and define a substantially looped shaped pathway therebetween for the original document as it is transported from the input on said front side to said output on said front side, said pathway comprising a forward portion through which the original document moves from the input on the front side inwardly into the apparatus, a bent portion enabling the original document to reverse its direction of movement and a reverse portion through which the original document moves from the bent portion toward the output on the front side, said hinged guide means being rotatable from the closed position to an open position separated from the fixed guide means and thereby providing access to the original document transport system.

2. In a reproduction apparatus including a pair of sidewalls mounted in spaced relationship, a camera means disposed between the sidewalls, a supply of copy paper, a copy paper transport system for transporting the copy paper past the image focal plane of the camera means, an original document transport system to transport the original document from an input to an output for reproduction by the camera means onto the copy paper, said original document transport system comprising:

a fixed guide means mounted to said sidewalls, said fixed guide means comprising a concave surface;

a hinged guide means rotatably mounted to said sidewalls, said hinged guide means comprising a convex surface substantially complementary with said concave surface, said convex surface being spaced from and opposed to the concave surface when the hinged guide means is in the closed position to define the innermost end of the pathway for the original document, whereby the original document changes direction in said innermost end from moving inwardly to moving outwardly toward the output.

3. In a reproduction apparatus including a pair of sidewalls mounted in spaced relationship, a camera means disposed between the sidewalls, a supply of copy paper, a copy paper transport system for transporting the copy paper past the image focal plane of the camera means, an original document transport system to transport the original document from an input to an output for reproduction by the camera means onto the copy paper, said original document transport system comprising:

a fixed guide means mounted to said sidewalls;

a hinged guide means, said hinged guide means comprising a module having a pair of side frame members with convex inner edges, the sidewalls of the frame having a concave cutout complementary with the convex edge of the side frame members, the concave cutout receiving the convex edge when the hinged guide means is in the closed position.

4. The photocopy apparatus of claim 1 wherein:

a pin member extends inwardly from the inside surface of each of said sidewalls;

a bar member is rotatably attached to said pin member and rigidly attached to the hinged guide means, said hinged guide means being rotatable around said pin;

support means for supporting said hinged guide means in the open position; and locking means for securing said hinged means to the sidewalls when said hinged means is in the closed position.

5. In a reproduction apparatus including a pair of sidewalls mounted in spaced relationship, a camera means disposed between the sidewalls, a supply of copy paper, a copy paper transport system for transporting the copy paper past the image focal plane of the camera means, an original document transport system to transport the original document from an input to an output for reproduction by the camera means onto the copy paper, the herein improvement being the original document transport system comprising:

support means for supporting said hinged guide means in the open position, said support means comprising a substantially V-shaped cutout formed inward from the outer edge of said sidewalls, said V-cut having an inner edge angled with respect to the upper edge of the sidewall to afford a stable support for the hinged guide means when it is in the open position.

6. In a reproduction apparatus including a pair of sidewalls mounted in spaced relationship, a camera means disposed between the sidewalls, a supply of copy paper, a copy paper transport system for transporting the copy paper past the image focal plane of the camera means, an original document transport system to transport the original document from an input to an output for reproducion by the camera means onto the copy paper, said original document transport system comprising:

a fixed guide means mounted to side sidewalls; and a hinged guide means rotatably mounted to said sidewalls, said hinged guide means having a closed position to cooperate with the fixed guide means and define a pathway therebetween for the original document, said hinged guide means being rotatable from the closed position to an open position separated from the fixed guide means and thereby providing access to the original document transport system;

a plurality of sets of cooperating rollers for moving the original document through said pathway, one roller from each of said sets being associated with said hinged means and another roller of said set being associated with said fixed guide means, said one roller and said another roller being in juxtaposition when the hinged guide means is in the closed position to transport the original document through said pathway and separated from each other when said hinged guide means is in the open position; and a main drive for simultaneously rotating said sets of rollers, the roller of each of said sets associated with the fixed guide means being linked with said main drive and caused to rotate by said main drive and thereby rotating the roller of the corresponding set associated with the hinged guide means when the hinged guide means is in the closed position.

7. The photocopy apparatus of claim 6, wherein:

an input pair of rollers moving the original document into said pathway, said input rollers being associated with the hinged guide means; and coupling means for linking the input rollers with the main drive when the hinged guide means is in the closed position.

8. The photocopy apparatus of claim 7, wherein said coupling means comprises a gear arrangement for linking said input rollers with said one roller of one of said sets associated with the hinged guide means whereby the rotation of said one roller causing the rotation of said gear arrangement to rotate said input pair of rollers.

9. In a reproduction apparatus including a pair of sidewalls mounted in spaced relationship, a camera means disposed between the sidewalls, a supply of copy paper, a copy paper transport system for transporting the copy paper past the image focal plane of the camera means, an original document transport system for transporting the original document from an input to an output for reproduction by the camera means into the copy paper, the herein improvement being the original document transport system comprising:

a fixed guide means associated with said sidewalls;

a hinged guide means pivotally associated with said sidewalls, said hinged guide means comprising a module, said module comprising:
   a pair of opposed and spaced apart side frame members;
   a feed tray on which the original document is initially placed;
   a pair of parallel spaced apart upper wall sections defining a pathway for receiving the original document after it leaves the feed tray, said wall sections inclining downward from the feed tray;
   an arcuate wall with a convex outer surface extending inward into the apparatus and downward from the upper wall sections; and
   an output wall section opposed and spaced from the wall sections and the feed tray, said output section extending outward from the convex surface, said feed tray, said wall section, said arcuate wall, and said output section being rigidly secured to said side frame members.

10. The photocopy apparatus of claim 9, wherein said fixed guide means comprises:
   a concave surface complementary with the convex surface of the module; and
   an output wall segment extending outward from the concave surface, said output wall segment including a transparent section through which the image of the moving original document is viewed by the camera means, said concave surface and said output segment of the fixed guide means being respectively spaced from and substantially parallel with the convex surface and the output section of the hinged guide means when the hinged guide means is in the closed position to define said pathway to the output for the original document, the original document moving from the input to the output through the pathway between the wall sections of the hinged guide means and the pathway between the hinged and fixed guide means.

11. The photocopy apparatus of claim 10 wherein:
   an input set of rollers is journalled to said side frame members and is positioned between the feed tray and the inclined wall sections;
   a second set of rollers comprising a drive roller and idler roller, said drive roller being jounalled to said sidewalls and positioned adjacent the upper edge of the concave surface of the fixed guide means, said idler roller being journalled to said side frame members of the module and positioned between the sidewall sections and the convex surface;
   a third set of rollers comprising a drive roller and an idler roller, said drive roller of the third set being jounalled to said sidewalls and positioned between the concave surface and the output wall segment of the fixed guide means, said idler roller of the third set being journalled to said side frame members and positioned between the convex surface and the output section of the module;
   an output set of rollers comprising a drive roller and an idler roller, said drive roller of the output set being jounalled to the sidewalls and disposed in the output wall segment of the fixed guide means adjacent the transparent section, said idler roller of the output set being journalled to the side frame members and positioned in the output wall section of the module;
   a main drive linked to the drive rollers of said sets of rollers; and
   coupling means for linking the idler roller of the output roller set with the input roller set whereby the rotation of the drive roller of the output set causing the rotation of the input roller set.

12. The photocopy apparatus of claim 11, wherein:
   a pin member extends inwardly from the inside surface of each of said sidewalls; and
   a bar member is rotatably attached to said pin member and rigidly attached to the inside surface of the side frame members of the module, said module being rotatable around said pin for moving the hinged guide means from the closed position to the open position.

References Cited

UNITED STATES PATENTS

| | | | |
|---|---|---|---|
| 3,051,408 | 8/1962 | Finch | 346—145 X |
| 3,343,450 | 9/1967 | Glaser et al. | 355—51 |
| 3,363,256 | 1/1968 | Evans | 346—145 X |

NORTON ANSHER, Primary Examiner

R. A. WINTERCORN, Assistant Examiner

U.S. Cl. X.R.

246—33, 136, 145; 255—65, 66, 84, 99